Aug. 31, 1954 E. M. BUTLER 2,687,996
ELECTROLYTIC WATER CORRECTION DEVICE
Filed Sept. 29, 1949 3 Sheets-Sheet 2
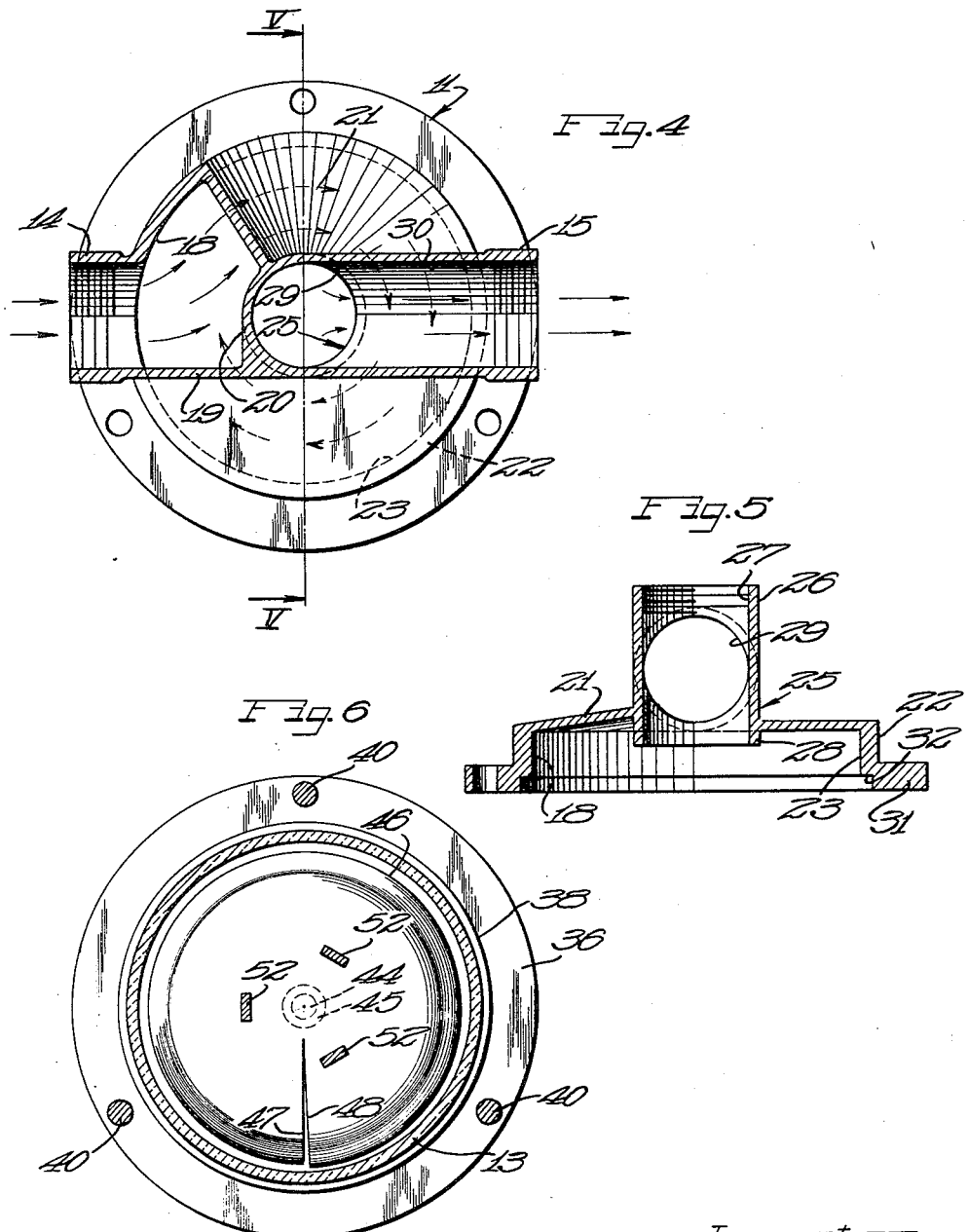
Inventor
Edgar M. Butler

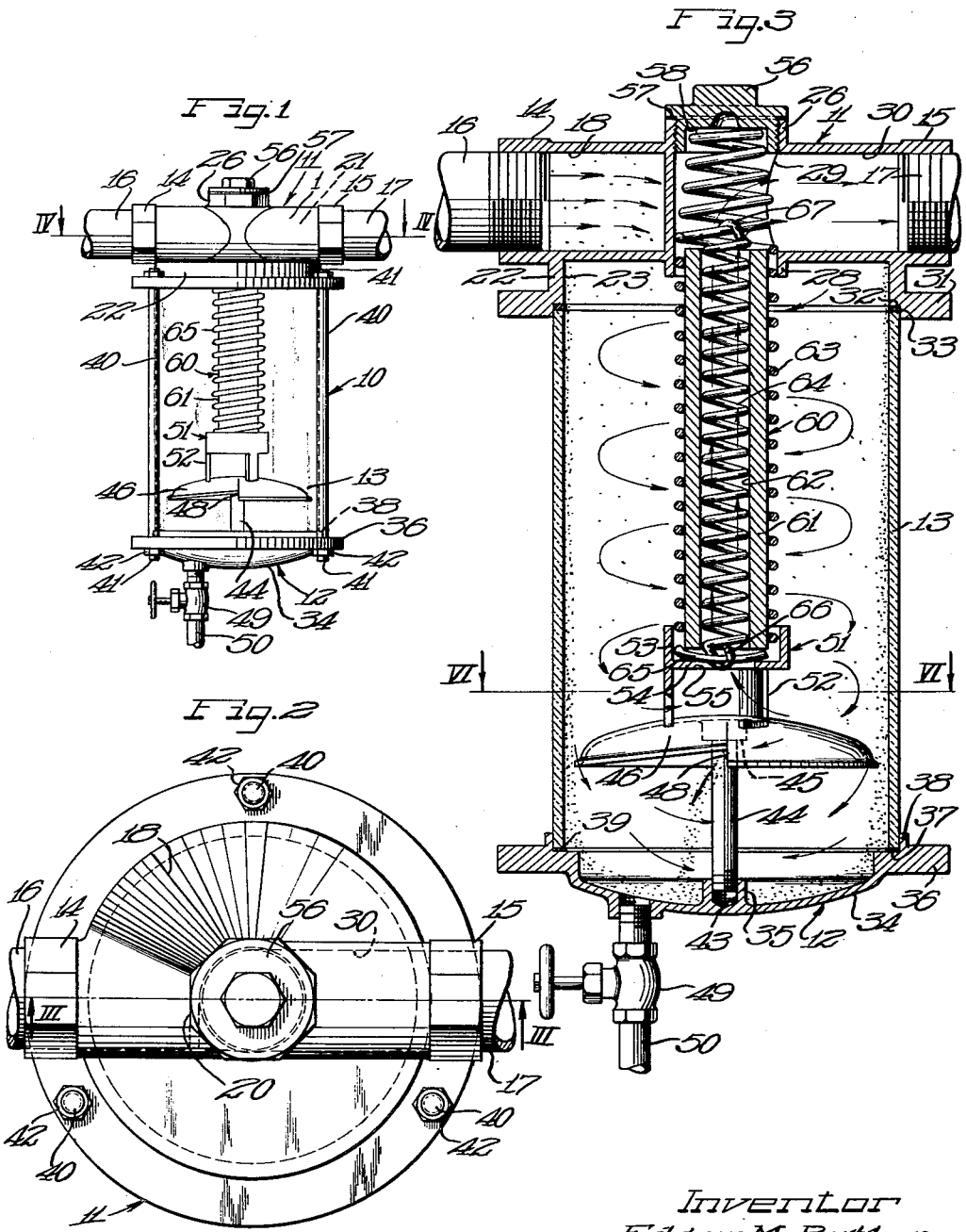

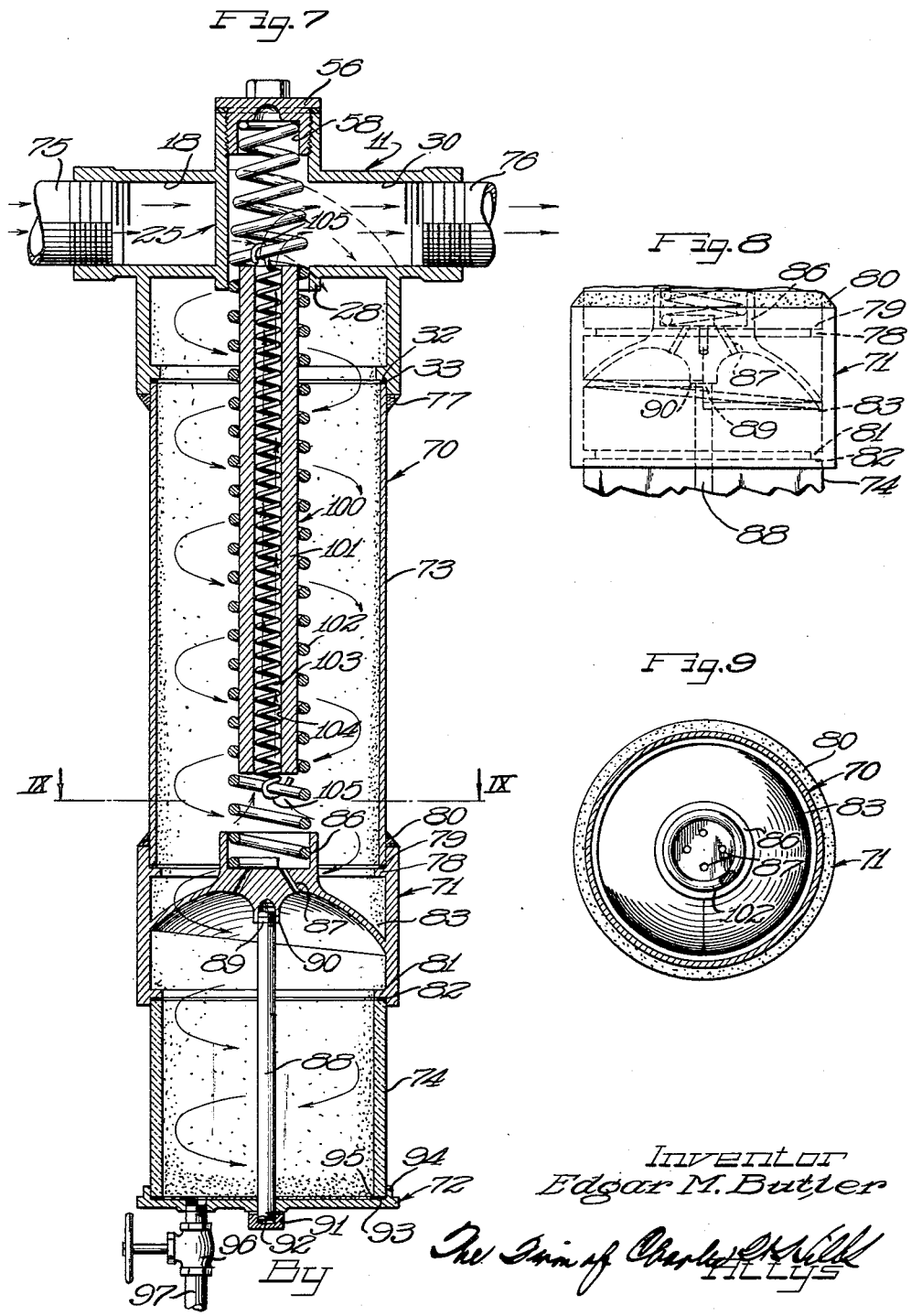

Patented Aug. 31, 1954

2,687,996

UNITED STATES PATENT OFFICE 2,687,996

ELECTROLYTIC WATER CORRECTION DEVICE

Edgar M. Butler, New Orleans, La., assignor to Butler Engineering Company, Inc., New Orleans, La.

Application September 29, 1949, Serial No. 118,483

8 Claims. (Cl. 204—248)

The present invention relates to a self-energizing electrolytic water correction device and more particularly to such a device employed in conjunction with a centrifugal solids separator in which an aqueous electrolyte substantially free of suspended solids is recycled in contact with the device for electrolytic correction.

The instant application is a continuation-in-part of my earlier filed pending application entitled "Electrolytic Water Correction Device," Serial No. 86,423, filed April 9, 1949 (now abandoned).

It has long been known that the use of "hard" water in circulatory water systems results in the formation of scale on various parts of the system. In recirculatory water systems, successive layers of scale are built up upon the heat exchange surfaces in contact with the water and upon the connecting piping of the system. This formation of scale may seriously interfere with the heat transfer efficiency of the system and also, in extreme cases, may actually impair the circulation of water through the system.

The present invention provides an electrolytic water correction device for employment in circulatory water systems, and especially for employment in recirculatory heat exchange systems, such as the cooling system for internal combustion engines, for the correction of water flowing through the system to precipitate scale forming ingredients in the water as a soft sludge rather than an adherent, hard scale. The device is employed in conjunction with a centrifugal-type solids separator for removing suspended solid matter from the aqueous electrolyte flowing through the system, the separation of solids being substantially accomplished prior to intimate contact between the aqueous electrolyte and the water correction device in order that efficient water correction is insured.

In this manner, it is possible to remove from the electrolyte loose particles of scale present in the electrolyte because of the partial dissolution of scale from the system and the flaking of non-dissolved scale upon such partial dissolution. Also, although the solid decomposition products of the correction device itself are essentially colloidal in nature and size and are not corrosive or erosive, these colloidal particles may grow to such size as to interfere with flow of electrolytes through the system, and these relatively large particles are removed from the system to prevent their clogging the system, while those being decomposition products still in the colloidal state are allowed to circulate to afford continued water correction activity.

According to the principles of the present invention, an aqueous electrolyte containing suspended foreign matter flows in a spiral path downwardly through a cylindrical casing so that the suspended foreign matter is flung outwardly, under the influence of centrifugal force, for collection in a solids separation chamber. Following separation of the suspended solids, the substantially solids-free water is directed axially of the casing through an outlet for reentry into the circulatory system in which the device of the present invention is employed.

A water correction device is positioned axially of the casing for contact with the relatively solids-free electrolyte present in the central portion of the casing during the downwardly spiral movement of the electrolyte therethrough. The water correction device is axially bored to provide an axial outlet path for solids-free electrolyte, and the axial passage of the electrolyte from the casing is accomplished through the bore of the correction device. In this manner, contact of the electrolyte with the water correction device is increased and efficient water correction of substantially solids-free electrolyte is insured with the decomposition products of said anode being circulated through the system. Further, both the inner and the outer surfaces of the correction device are employed for electrolytic water correction, and the efficient utilization of the water correction device is made possible. In addition, it has been found that the decomposition products of the anodic element are capable of coagulating finely divided solids in the water to enable their removal by centrifugal action upon flow through the separator.

It is, therefore, an important object of the present invention to provide an improved electrolytic water correction device for the correction of aqueous electrolytes.

Another important object of the present invention is to provide a combined electrolytic water correction device and solids separator for a circulatory water system in which substantially solids-free water is contacted with the correction device and then recycled through the device for further correction.

Still another important object of the present invention is to provide a centrifugal-type solids separator for fluid systems through which water containing suspended matter is circulated, the separator having an inlet opening and an outlet opening with an electrolytic water correction device interposed therebetween with discharge from the separator taking place axially through the device to insure the electrolytic correction of substantially solids-free water.

It is a further important object of the present invention to provide an improved method for the electrolytic correction of an aqueous electrolyte containing suspended foreign matter including the steps of centrifugally separating the foreign matter from the aqueous electrolyte, contacting substantially solids-free electrolyte with the exterior surfaces of an axially bored electrolytic water correction device and passing the electrolyte through the axial bore of the device to further treat the electrolyte.

Other and further important objects of this invention will be apparent from the disclosures in the specification and the accompanying drawings.

On the drawings:

Figure 1 is a side elevational view of an electrolytic water correction device of the present invention disposed in a circulatory water system;

Figure 2 is a top plan elevational view of the device of Figure 1;

Figure 3 is an enlarged sectional view, with parts shown in elevation, of the device taken along the plane III—III of Figure 2;

Figure 4 is a sectional view taken along the plane IV—IV of Figure 1;

Figure 5 is a sectional view taken along the plane V—V of Figure 4;

Figure 6 is a sectional view taken along the plane VI—VI of Figure 3;

Figure 7 is a vertical sectional view, with parts shown in elevation, similar to Figure 3, illustrating a modified form of the device of the present invention;

Figure 8 is a fragmentary side elevational view of the device of Figure 7; and

Figure 9 is a sectional view taken along the plane IX—IX of Figure 7.

As shown on the drawings:

In Figure 1, reference numeral 10 refers generally to a combined electrolytic water correction device and solids separator of the present invention including an upper head 11, a lower head 12 spaced from the head 11, and a casing 13 confined therebetween.

The upper head 11 comprises a metal casing provided with oppositely directed inlet and outlet nipples 14 and 15 respectively. The inlet nipple 14 is interiorly threaded to receive an inlet conduit 16 communicating with a water circulatory system and the outlet nipple 16 communicates with an outlet line 17 also forming a portion of the circulatory system.

The inlet nipple 14 communicates with an inlet passage 18 formed interiorly of the head 11 and defined by a curved side wall 19, a transversely extending end wall 20 and a downwardly sloping upper wall 21 extending toward the outlet nipple 15. The downwardly extending wall 21 merges with the dependent boss 22 formed integrally with the head 11 and having an axial recess 23 in full flow communication with the inlet passage 18 and the casing 13 (Figures 3 and 4). It will be seen that water flow through the inlet nipple 14 will be deflected by the end wall 20 into a spiral path defined by the passage 18 passing beneath the outlet nipple 15 downwardly into the casing 13 through the recess 23 of the boss 22.

It will be seen in Figures 3 and 4 that the wall 20 forms a portion of an upstanding cylindrical embossment 25 formed integrally with the head 11 and concentric therewith. The embossment 25 has an upper portion 26 extending upwardly beyond the inlet and outlet nipples 14 and 15 and is provided with interior threads 27, while the lower portion 28 of the embossment 25 extends below the inlet and outlet nipples 14 and 15. The bore of the embossment 25 also communicates with the recess 23 of the boss 22, while the central portion of the embossment is cut away, as at 29 (Figures 3 and 4) for communication with an outlet passage 30 in full flow communication with the outlet nipple 15. Thus, the egress of fluid from the bore 23 of the boss 22 may take place through the embossment 25 and the aperture 29 formed therein into the outlet passage 30 communicating with the outlet nipple 15.

The boss 22 terminates in an integrally formed outturned peripheral flange 31 having an inner annular shoulder 32 receiving an annular gasket 33 receiving the open upper edge of the casing 13 is seated. The casing 13 is substantially cylindrical in configuration and is preferably formed of a transparent sheet material, such as glass or a suitable plastic.

The lower head 12 is also preferably cast and comprises a slightly downwardly dished central portion 34 provided with a central upstanding boss 35 and an outer peripheral flange 36 having an inner annular shoulder 37 surrounded by an upstanding annular rib 38. The shoulder 37 is adapted to receive an annular gasket 39 abutting the lower open end of the casing 13 with the rib 38 surrounding the adjacent rim of the casing. The heads 11 and 12 are secured together by means of a plurality of elongated tie bolts 40 having threaded terminal portions 41 extending through aligned apertures in the flanges 31 and 36 of the head 11 and the head 12, respectively, each of the bolts 40 receiving a nut 42 abutting the respective heads.

The upstanding boss 35 of the lower head 12 is provided with a central threaded recess 43 receiving an upstanding post 44 having one end threaded therein. The other end of the post is threaded into a similar recess formed in a central boss 45 depending from a convex, upwardly dished deflector plate 46. The plate 46, as best shown in Figure 6, is radially slit, as at 47, with one edge 48 of the slit being depressed for a purpose to be hereinafter described.

The bottom head also carries a blow out valve 49 interposed in a conduit 50 communicating with the interior of the casing 13 beneath the plate 46 for removing sediment from the casing 13 as will be hereinafter described.

The plate 46 carries a cup 51 mounted thereon on spaced, generally rectangular legs 52. The cup 51 is generally cylindrical, having upstanding peripheral side walls 53 and a radially extending bottom wall 54 centrally apertured as at 55 to permit communication between the interior of the casing 13 and the cup 51. A plug 56 is threadedly retained by the threaded aperture 27 of the upstanding boss 25 formed in the head 11 and a gasket 57 is interposed between the plug 56 and the boss to insure water tight engagement therebetween. The plug is provided with a cylindrical recess 58 in the inner face thereof and opposing the cup 51 in spaced relation thereto, for a purpose to be hereinafter described.

A self-energizing electrolytic water correction device is positioned between the plug 56 and the cup 51, the device being bottomed between the plug recess 58 and the bottom wall 54 of the cup 51. The device 60 comprises generally a cylindrical anodic core member 61 having an axial bore 62, the core being formed of an electronegative metal of the electromotive force series, preferably a metal above hydrogen in the electromotive force series of elements, such as zinc, magnesium or aluminum.

The electropostive element of the device 60 is provided by an outer helical coil spring 63 in intimate gripping engagement with the exterior cylindrical surface of the core 61 and by a second helical spring 64 of lesser diameter than the spring 63 in engagement with the inner peripheral surfaces of the bore 62. The springs 63 and 64 are formed of a relative electropositive metal of the electromotive force series of elements, preferably a metal below hydrogen in the electromotive force series, such as silver, copper or silver or copper surfaced base metals, such as a ferrous alloy.

One terminal portion 65 of the outer spring 63 is deformed radially inwardly of the core 61 to overlie the bore 62 and the corresponding end portion of the inner spring 64 is deformed into a hooked end 66 encircling the portion 65 of the outer spring 63 to secure the inner spring 64 to the outer spring. The opposing end of the inner spring 64 is likewise deformed into a hook 67 extending beyond the confines of the bore 62 and engaging an adjacent coil of the spring 63. That end of the spring 63 remote from the end 65 is of a reduced exterior diameter to fit within the recess 58 of the plug 56, while the end 65 abuts the inner surface of the wall 54 of the cup 51 to bottom the device 60 therein. It will thus be seen that the device 60 is suspended in position between the plug 56 and the cup 51 to extend axially of the casing 13.

The operation of the embodiment of the invention illustrated in Figures 1-6, inclusive, will now be described.

It will be seen from Figures 3 and 4 that water, or a similar electrolyte, entering the inlet passage 18 through the conduit 60 will be deflected radially of the device 10 by the end wall 20 and will be directed downwardly by the sloping upper wall 21. Of course, downward water flow will be aided by gravitational forces, so that water from the inlet conduit 18 flows to the interior of the casing 13. Thus, water entering the casing 13 flows in a generally spiral, downward path confined by the inner walls of the casing 13. As the water travels through the casing in a spiral path, centrifugal forces acting upon any solids suspended with the fluid stream will force the particles from the stream radially outwardly of the casing into the region of a relatively slowly traveling fluid film flowing down the inner surfaces of the casing 13 to carry the solids particles to the lower portions of the casing. Thus, fluid flowing through the casing is forced to make a series of successive, short radical changes in direction with the stream being subjected to radial, tangential and gravitational forces during its course through the casing.

The solids thrown into the thin film of liquid adjacent the side walls, and moving slowly downwardly therealong due to fluid friction with the side walls, will be carried into the lower portion of the casing to settle within the region of the deflector plate 46 or therebeneath. Following the passage of liquid through the casing to the position of the plate 46, the liquid impinging upon the plate and still traveling in a spiral direction will follow around the plate to skim unsettled foreign particles therefrom off the downturned edge 48 into the casing region underlying the plate. The concave plate 46 also serves to deflect liquid flow upwardly between the legs 52 and through the aperture 55 into the bore 62 of the water correction device 60. Thus, the plate 46 serves a triple function, i. e. to divide the casing into upper centrifugal and lower settling regions, to deflect water flow upwardly to the device 60, and to skim any remaining solid particles from the spirally traveling liquid. The convex upper surface of the plate 46 presented to the water prevents the generation of excess eddy currents within the region of the plate, so that the water is smoothly deflected upwardly without carrying solids separated therefrom with the deflected stream into the device 60.

The only exit for fluid from the casing 13 is provided by means of the bore 62 communicating with the outlet passage 30 and the conduit 17. Therefore fluid flow in this direction will be established axially of the casing 13 with the solid particles falling into the settling region between the plate 46 and the inner surface of the lower head 12 for subsequent removal as desired through the blow out valve 49 of the conduit 50.

It will be seen that, as the liquid follows its spiral course through the casing 13, only those portions of the liquid near the center of the casing 13 will come in contact with the electrolytic water correction device 60 for reaction therewith. Thus, the water contacting the device 60 is relatively free of suspended foreign matter which has been removed centrifugally therefrom, thus preventing unwarranted erosion of the negative element core 61 by the sharp solids particles. In addition, the efficiency of water correction is enhanced by the presentation of relatively solids free water to the electrolytic device to cause dissolution of hydrated negative metal ions therein as is well understood in the art. Water flowing through the separator of the casing 13 to the discharge passage 30 is also subjected to the corrective action of the correction device 60 as it flows trough the bore 62 thereof. In this manner, the water is not only corrected during its initial course through the casing, but is also recycled into further contact with the device as the water flows from the casing. Finely divided solids dispersed in the water flowing through the separator are coagulated by the colloidal decomposition products of the anodic element of the galvanic couple 60, thus making removal of these particles possible by centrifugal action. The efficiency of the separator is thereby enhanced by the electrolytic dissolution of the anode.

If the velocity of water flow through the device is so low as to prevent the spiral travel of water therethrough, the entire separator will serve as a settling tank to permit settling of solids from the water prior to removal of the water through the bore 62 of the device 60 again making possible efficient water correction.

In the modification of the instant invention as illustrated in Figures 7-9, parts of the device 70 identical with the device 10 of Figures 1-6, inclusive, are indicated by identical reference numerals. Thus, the device 70 is provided with an upper head 11 substantially identical with the head 11 hereinbefore described, an intermediate head 71 and a lower terminal head 72. A cylindrical sheet metal casing 73 is confined between the heads 11 and 71 while a second cylindrical casing 74 formed of suitable glass or plastic material is confined between the heads 71 and 72.

The head 11 communicates with inlet and outlet conduits 75 and 76, respectively, and an inlet passage 18 and an outlet passage 30 communicate with these conduits, as hereinbefore described in connection with the first embodiment of the present invention. The casing 73 is seated upon a gasket 33 bottomed on an internal shoulder 32 as hereinbefore described, the metal casing 73 in this instance being welded, brazed or soldered to the head 11, as at 77.

The intermediate head 71 is provided with an inwardly directed annular shoulder 78 having a gasket 79 seated thereon for receiving the lower annular end of the casing 73 which is secured to the head 71 by suitable means, as at 80. The head 71 is provided with a lower inwardly directed annular shoulder 81 having a gasket 82 bottomed thereagainst to receive the upper annular open end of the lower casing 74. A helical, convex deflector plate 83 extends generally radially across the interior of the head 71, the plate 83 being slit as at 84 in a manner analogous to the slit 48 in the plate 46 hereinbefore described in connection with Figure 3 of the drawings. The plate 83 carries a central upwardly extending post 85 terminating in an open topped recess 86 communicating with an intermediate region of the cup through cylindrical bores 87.

The lower head 72 is secured to the intermediate head 71 by means of a rod 88 having an upper threaded end 89 threadedly retained by a depending boss 90 formed integrally with the cup 83 and a lock 91 secured to the opposing threaded end 92 of the rod 88 extending through a central aperture in the head 72, the nut 91 abutting the outer surface of the head 72. The head 72 is provided with an inwardly directed annular shoulder 93 surrounded by an upstanding annular rib 94, the shoulder 93 receiving a gasket 95 seated thereon and receiving the annular open lower end of the casing 74.

A self-energizing electrolytic water correction device 100 extends axially of the casing 74, the device comprising a cylindrical core 101 substantially identical with the core 61 hereinbefore described in connection with the first embodiment of applicant's invention and inner and outer helical coil springs 102 and 103 contacting the exterior surfaces and the interior bore 104 respectively of the core 101. The outer coil spring 102 is bottomed in the cup 86 at one end and in the recess 58 of the plug 56 in the other end with the core extending into the lower portion 28 of the embossment 25 of the upper head 11. The opposing ends of the inner spring 103 are deformed into hooks 105 engaging adjacent portions of the outer spring 102 to secure the inner spring 103 within the bore 104.

The operation of the embodiment of Figure 7 is substantially identical with that hereinbefore described, with water passing through the casing 73 in a generally spiral downward path for deflection upwardly from the plate 83 through the bore 104 of the core 101 and thence to the outlet passage 30. However, in this instance substantially all of the foreign particles centrifugally flung outwardly from the liquid stream contact the plate 83 and are skimmed therefrom into the lower settling chamber defined by the casing 74 for subsequent removal therefrom through the blowout valve 96 and the conduit 97.

It will thus be seen that the present invention provides a new and improved self-energizing electrolytic water correction device for employment in conjunction with aqueous electrolytes containing suspended foreign matter with the electrolyte substantially free of suspended matter being brought into contact with an electrolytic water correction device for correcting the electrolyte. The electrolyte is then recycled through the bore of the device for further correction as the electrolyte is removed from the separator.

The advantages residing in the present invention will be obvious to those skilled in the art and include the provision of an inlet and an outlet passage in a single head of a separator, the passages lying in a single plane so that connection to a circulatory system is simplified. Further, the electrolyte traverses both the exterior and interior surfaces of a water correction device to utilize all exposed surfaces of the device to enhance the efficiency of electrolytic correction. Further, a lower deflector plate is employed to divide the casing into an upper centrifugal chamber and a lower settling chamber, to deflect water upwardly through the bore of the correction device, and to efficiently separate or skim foreign particles from the liquid medium in which they are suspended.

It will be understood that modifications and variations may be effected without departing from the scope of the novel concepts of the present invention.

I claim as my invention:

1. A combined solids separator and water correction unit comprising a cylindrical casing having opposed open ends, an upper head closing one open end of said casing having an inlet opening communicating therewith and a central inwardly extending embossment having an axial bore communicating with an outlet opening, means closing the top of said axial bore, a lower head closing the other open end of said casing, a deflector plate carried by said lower head and extending radially across said casing, an open topped cup mounted centrally of said plate and extending upwardly therebeyond in opposed spaced relation to said embossment, an axially bored anode formed of an electronegative metal of the electromotive force series extending axially of said casing, and a cathodic helical spring formed of an electropositive metal of the electromotive force series in tight gripping engagement with the outer surface of said anode, said spring having terminal portions bottomed in said cup and against said means closing said embossment bore to secure said anode therebetween to extend axially of said casing.

2. In a solids separator including an open ended casing and spaced heads closing said casing, one of said heads being provided with an inlet opening and an outlet opening for introducing water containing suspended solids into said casing, the improvements of an upwardly dished deflector plate extending radially across the interior of said casing to divide the same into an upper separation chamber and a lower collection chamber, said plate also serving to deflect water impinging thereon upwardly toward said outlet opening, an anodic element formed of an electronegative metal of the electromotive force series of elements extending axially of said casing and having an axial bore for conducting water deflected from said plate to said outlet opening, and a helical spring formed of an electropositive metal of the electromotive force series of elements in tightly gripping engagement with said anodic element and confined between said plate and said head to maintain said element in position.

3. A combined solids separation and water correction unit comprising a pair of spaced heads, a casing confined between said heads and having an interior cylindrical wall surface, water inlet means in one of said heads for introducing water into said casing in a helical path, whereby solid particles in said water tend to be thrown radially outwardly of the casing into contact with said cylindrical wall surface, an anodic core formed of an electronegative metal of the electromotive force series extending between said heads and having an axial bore therethrough communicating at its lower end with the interior of said casing to receive water flow therefrom, an upwardly dished plate extending transversely of said casing below said axial bore and with its outer perimeter in spaced relation to said cylindrical wall surface, said plate having a slot and the edges of said slot being vertically offset to provide a radially extending raised edge for skimming residual particles from the water flowing thereacross, a helical wire spring formed of an electropositive metal of the electromotive force series engaging the exterior surface of said anode and seated in said one head to suspend said core therefrom, a second helical spring of an electropositive metal of the electromotive force series positioned within the core of said anode and secured to said first spring, water discharge means formed in said first head for receiving water flowing upwardly from said dished plate through said anode bore, said dished plate providing therebeneath a settling chamber, and a lower drain from said settling chamber through said second head.

4. In a centrifugal solids separator including spaced heads and a casing having an interior cylindrical wall surface extending therebetween, the upper of said heads having an inlet passage for introducing an aqueous electrolyte containing suspended solids into said casing to flow therethrough, baffle means in the upper of said heads for deflecting the electrolytic flow through the casing in a helical path defined by said casing wall surface whereby said suspended solids tend to be thrown radially outwardly of the casing into contact with said wall surface, the improvements which comprise a deflector plate concentric with and extending radially of said wall surface and having an upper convex surface in spaced relation to said upper head to deflect said electrolyte flowing through said casing upwardly toward said upper head, said plate having a radial slot defining vertically offset radially outwardly divergent edges for skimming residual solids from said electrolyte impinging thereon, and said plate cooperating with that casing portion lying therebeneath to define a solids collection chamber.

5. A combined solids removal and water correction assembly for a circulatory water system, comprising a hollow casing having an interior wall surface of generally circular cross-section, a pair of heads closing said casing, means including a tangentially arranged intake fitting carried by one of said heads for tangentially introducing water containing solid matter into said casing, said one head having a water outlet, a self-energizing galvanic couple mounted within said casing and extending generally axially of and centrally of said hollow casing in spaced relation to said interior wall surface, said galvanic couple including a core of electronegative metal of the electromotive force series having an interior open ended passageway extending axially therethrough opening at one axial end of said couple within said casing and remote from said one head and connecting at the other end with said outlet.

6. A combined solids removal and water correction assembly for a circulatory water system, comprising a hollow casing having an interior wall surface of generally circular cross-section, a pair of heads closing said casing, means including a tangentially arranged intake fitting carried by one of said heads for tangentially introducing water containing solid matter into said casing, said one head having a water outlet pipe extending axially of said casing and opening centrally into said casing, and a galvanic couple mounted within said casing and extending generally axially of and centrally of said hollow casing in spaced relation to said interior wall surface, said galvanic couple including a cylindrical anode formed of an electronegative metal of the electromotive force series, said anode having an axial bore extending therethrough and opening at one end within said casing and remote from said one head and opening at the other end directly into said outlet pipe.

7. In a combined solids separation and water correction unit, a pair of spaced heads, a casing extending between said heads, inlet means carried by one of said heads for introducing water containing suspended solid particles into the interior of said casing, discharge means in said one head for receiving water flow from said casing, and a self-energizing electrolytic water correction device extending axially of said casing, said device including a generally cylindrical anodic core connected at one end with said discharge means and having an axial bore, one end of the bore being in direct flow communication with said discharge means and the other end opening in spaced relation to said other head and within said casing.

8. A replacement cartridge for a water correction device and removable from said device as a unit consisting essentially of a generally cylindrical anodic core formed of an eelctronegative metal of the electromotive force series having an axial bore therethrough, a first helical wire spring formed of an electropositive metal of the electromotive force series grippingly engaging the exterior surface of said core and carried thereby, and a second helical spring also of an electropositive metal of the electromotive force series fixedly positioned within the bore of said core in contact with the interior walls thereof, and carried by said core whereby said core together with the springs carried thereby may be handled as a unit in replacing the cartridge of the water correction device.

References Cited in the file of this patent

UNITED STATES PATENTS

| Number | Name | Date |
| --- | --- | --- |
| 525,303 | Woods | Aug. 28, 1894 |
| 1,058,113 | Stuckel | Apr. 8, 1913 |
| 2,334,790 | Roffy | Nov. 23, 1943 |
| 2,381,760 | Latham | Aug. 7, 1945 |
| 2,451,067 | Butler | Oct. 12, 1948 |

FOREIGN PATENTS

| Number | Country | Date |
| --- | --- | --- |
| 493,415 | Great Britain | Oct. 7, 1938 |